Sept. 7, 1926.
G. W. CURTIS
CONVEYER ROLLER CONSTRUCTION
Filed Oct. 13, 1924
1,598,604
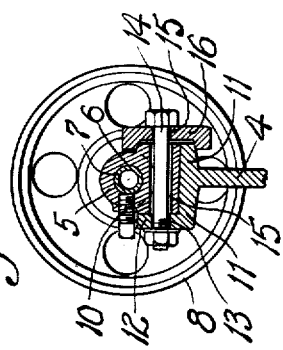
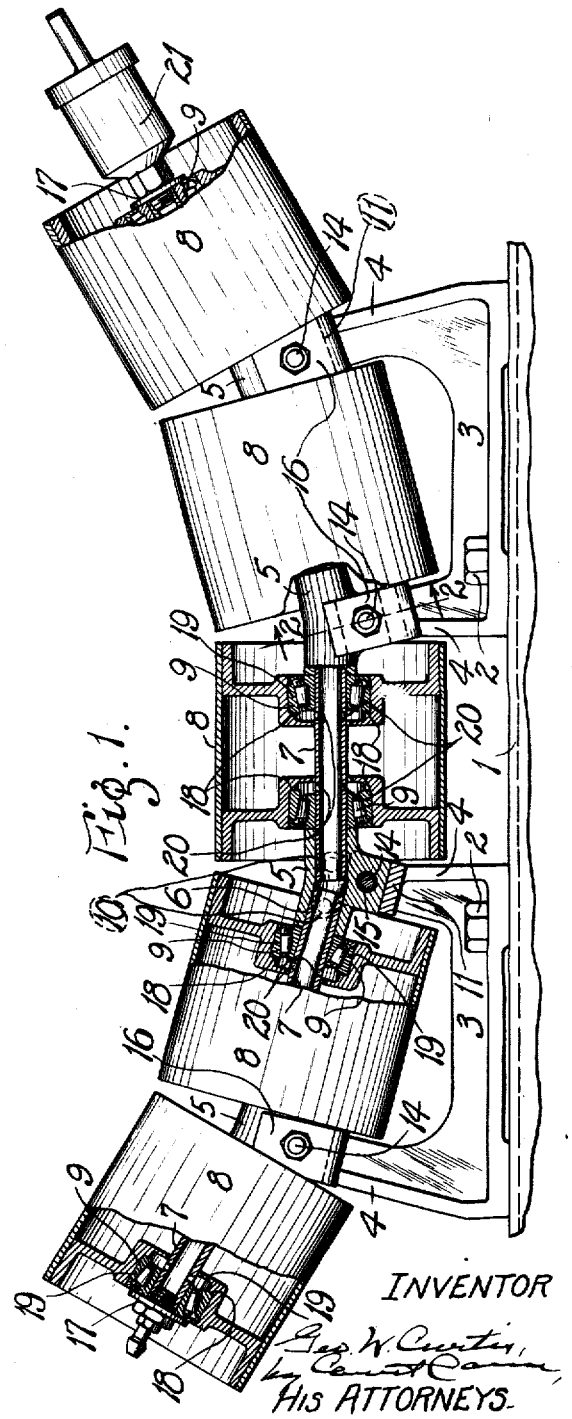
INVENTOR
Geo. W. Curtis,
HIS ATTORNEYS.

Patented Sept. 7, 1926.

1,598,604

UNITED STATES PATENT OFFICE.

GEORGE W. CURTIS, OF CANTON, OHIO, ASSIGNOR TO THE TIMKEN ROLLER BEARING COMPANY, OF CANTON, OHIO, A CORPORATION OF OHIO.

CONVEYER ROLLER CONSTRUCTION.

Application filed October 13, 1924. Serial No. 743,291.

My invention relates to conveyer roller constructions composed of a number of stands or sets of rollers, each of which comprises a series of rollers mounted end to end; and it has for its principal objects a construction in which the several rollers and their bearings are easily adjusted, a construction in which a series of rollers may be removed from the conveyer without disturbing the relative position or adjustment of the individual rollers of the series and in which the several parts of the frame may be made of castings that require a relatively small amount of machining or other finishing work.

My invention consists principally in the conveyer roller construction and in the parts and combinations and arrangement of parts hereinafter described and claimed.

In the accompanying drawing, which forms part of the specification and wherein like reference characters indicate like parts wherever they occur, Fig. 1 is a part elevation part longitudinal sectional view of a conveyer roller construction embodying my invention, and Fig. 2 is a cross sectional view on the line 2—2 of Fig. 1 showing the clamping means for securing the roller holding members to the frame.

Secured to a suitable base 1 as by screws 2 are frame members 3 that have upstanding arms 4. Secured to each arm 4 is a block 5 that is provided with a bore 6, each end of which is adapted to receive a hollow spindle 7 on which is mounted a conveyer roller 8, anti-friction bearings, as conical roller bearings 9, being interposed between the spindles 7 and the conveyer rollers 8. Set screws 10 are provided for securing the spindles in position in the blocks 5.

Each frame arm 4 has a flange top portion 11 constituting a seat for a block 5 and a rib 12 projects upwardly from one side of said seat 11. The blocks 5 rest on said seat portions 11 of the frame arms 3 and against said ribs 12. Each rib 12 is provided with a hole 13 through which passes a bolt 14 and each block 5 is provided with a hole 15 through which the bolt extends, said hole being of larger diameter than said bolt. Mounted on the other end of each bolt 14 is a clamping plate 16 having a hole 21 through which the bolt extends. Said clamping plate engages the block 5 and the flanged portion 11 of the frame arm 4; so that by tightening up the bolts 14 the blocks 5 are firmly clamped on the frame arms 4. By loosening the bolts 14 the positions of the blocks 5 may be adjusted and by removing the bolts 14 the whole series of conveyer rollers 8 may be removed as a unit. Said rollers 8, spindles 7 and blocks 5 may be assembled and then installed as a unit on the frame members 3.

Preferably a nut 17 is provided on each endmost roller 8 to seat against the end bearings 9. The conveyer rollers preferably have shouldered seats 18 in their hub portions for receiving the bearing cups 19. Preferably the mounting spindles 7 are hollow and lubricant is forced throughout the of the rollers from one end, the spindle being provided with suitable openings 20 adjacent to each bearing 9 and lubricant retainers 21 being provided for each bearing.

The invention is illustrated as embodied in a series of rollers of the "troughing" type, one arm of each frame member 3 being larger than the other and the bores of the blocks 5 (except those that receive the spindle of the middle roller) being inclined; but obviously the invention is applicable to other types of conveyers.

The construction has numerous advantages; it permits easy adjustment of the conveyer rollers and their bearings; it facilitates assembling and dismantling of the conveyer, by making it possible to install and remove a series of rollers as a unit. It is noted that the frame members, blocks and clamping plates may be castings and that only a very small amount of machining or other finishing work is required. Obviously numerous changes may be made without departing from the invention and I do not wish to be limited to the precise construction shown.

What I claim is:

1. A conveyer construction comprising frame arms having seats at the tops thereof and ribs along one side of said seats, blocks mounted on said seats and resting against said ribs, spindles mounted in bores provided therefor in said blocks, conveyer rollers on said spindles, and means for clamping said blocks on said seats and against said ribs.

2. A conveyer construction comprising frame arms having seats at the tops thereof and ribs along one side of said seats, blocks mounted on said seats and resting against said ribs, spindles mounted in bores provided therefor in said blocks, conveyer rollers on said spindles, and clamping plates and bolts passing through holes provided therefor in said clamping plates and ribs and through enlarged holes provided therefor in said blocks.

Signed at Canton, Ohio, this 8th day of October, 1924.

GEORGE W. CURTIS.

2. A conveyer construction comprising frame arms having seats at the tops thereof and ribs along one side of said seats, blocks mounted on said seats and resting against said ribs, spindles mounted in bores provided therefor in said blocks, conveyer rollers on said spindles, and clamping plates and bolts passing through holes provided therefor in said clamping plates and ribs and through enlarged holes provided therefor in said blocks.

Signed at Canton, Ohio, this 8th day of October, 1924.

GEORGE W. CURTIS.

Certificate of Correction.

It is hereby certified that in Letters Patent No. 1,598,604, granted September 7, 1926, upon the application of George W. Curtis, of Canton, Ohio, for an improvement in "Conveyer-Roller Constructions," an error appears in the printed specification requiring correction as follows: Page 1, line 72, for the article "the" read *all;* and that the said Letters Patent should be read with this correction therein that the same may conform to the record of the case in the Patent Office.

Signed and sealed this 5th day of October, A. D. 1926.

[SEAL.]

M. J. MOORE,
*Acting Commissioner of Patents.*

Certificate of Correction.

It is hereby certified that in Letters Patent No. 1,598,604, granted September 7, 1926, upon the application of George W. Curtis, of Canton, Ohio, for an improvement in "Conveyer-Roller Constructions," an error appears in the printed specification requiring correction as follows: Page 1, line 72, for the article "the" read *all;* and that the said Letters Patent should be read with this correction therein that the same may conform to the record of the case in the Patent Office.

Signed and sealed this 5th day of October, A. D. 1926.

[SEAL.]
M. J. MOORE,
*Acting Commissioner of Patents.*